US006459247B1

(12) United States Patent
Benes

(10) Patent No.: US 6,459,247 B1

(45) Date of Patent: Oct. 1, 2002

(54) POWER SUPPLY CAPABLE OF BEING CONFIGURED TO GENERATE POSITIVE AND NEGATIVE OUTPUT RESISTANCES

(75) Inventor: Michael Joseph Benes, Irvington, NJ (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/717,764

(22) Filed: Nov. 21, 2000

(51) Int. Cl.[7] .......................... G05F 1/40; H02M 11/00

(52) U.S. Cl. ....................................... 323/281; 327/103

(58) Field of Search ............................. 363/63, 60, 59; 323/277, 280, 281, 282, 283, 288; 327/334, 103

(56) References Cited

U.S. PATENT DOCUMENTS 3,781,642 A * 12/1973 Dutton ....................... 323/280
3,828,240 A * 8/1974 Keller et al. ................ 323/281
4,298,835 A * 11/1981 Rowe ......................... 323/281
4,325,021 A * 4/1982 McMackin .................. 323/351
4,335,344 A * 6/1982 Gant .......................... 322/25
5,043,730 A * 8/1991 Obinata ...................... 341/153
6,201,674 B1 * 3/2001 Warita ........................ 361/18

* cited by examiner

*Primary Examiner*—Rajnikant B. Patel

(57) ABSTRACT

The present invention relates to a power supply capable of being configured to produce an equivalent negative output resistance or to produce both negative and positive output resistances. The power supply comprises components that can provide equivalent output resistance values that transition from negative values through zero to positive values, and vice versa. By selecting an appropriate negative output resistance for the power supply, the power supply can compensate for the load lead voltage drop caused by the elements (e.g., cabling) between the output sense leads of the power supply and the load. This allows the voltage level provided to the load to be set, or controlled, by setting a voltage level $V_{SET}$ at the power supply. Preferably, a multiplier chip is used that enables the output resistance values of the power supply to be programmably varied from a negative resistance value through 0 to a positive resistance value, and vice versa. The multiplier chip receives a reference voltage $V_{REF}$ that can be varied in order to vary the output resistance of the power supply.

34 Claims, 3 Drawing Sheets

Schematic of power supply with bipolar output resistance feature

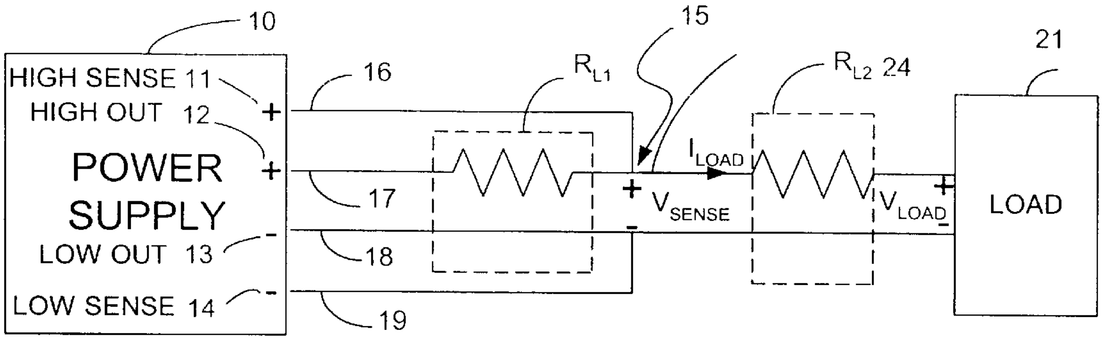
FIGURE 1: Setup of power supply with load lead resistance and load shown
Notes:
1. While this diagram depicts a dc supply this concept can be extended to ac sources as well.
2. Resistance found in "low out" load wire 18 has been lumped into "high out" load wire for clarity.
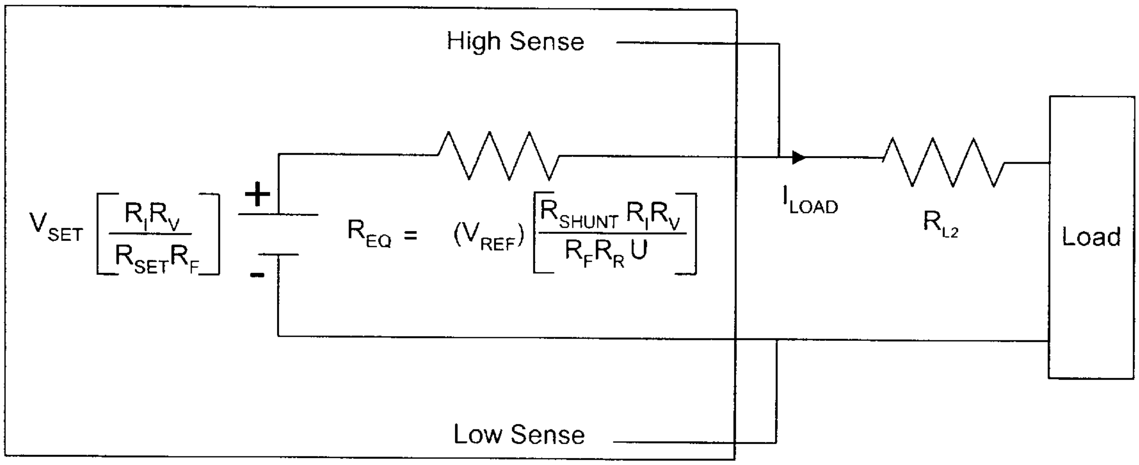
FIGURE 2: Equivalent model of power supply

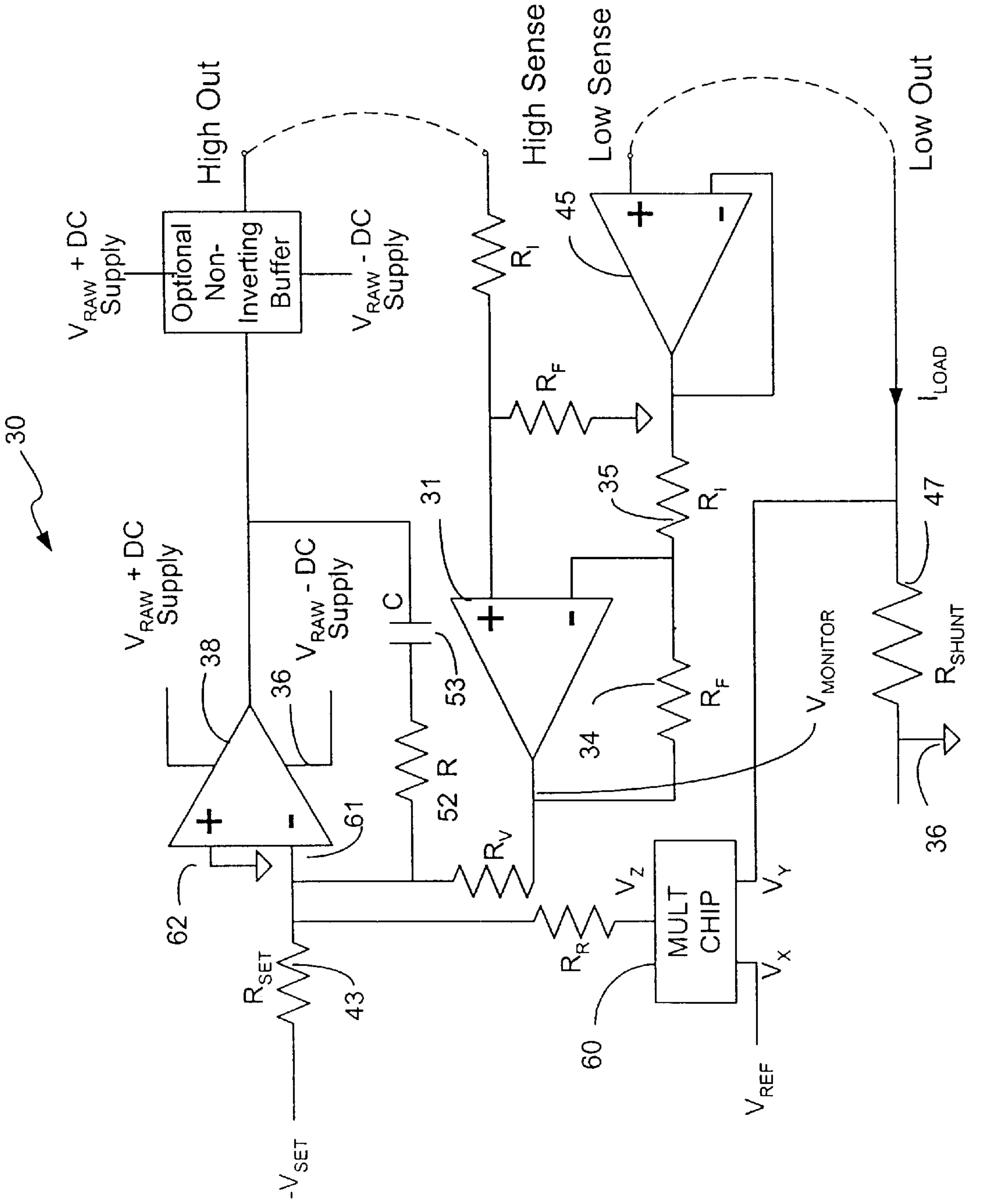
FIGURE 3: Schematic of power supply with bipolar output resistance feature

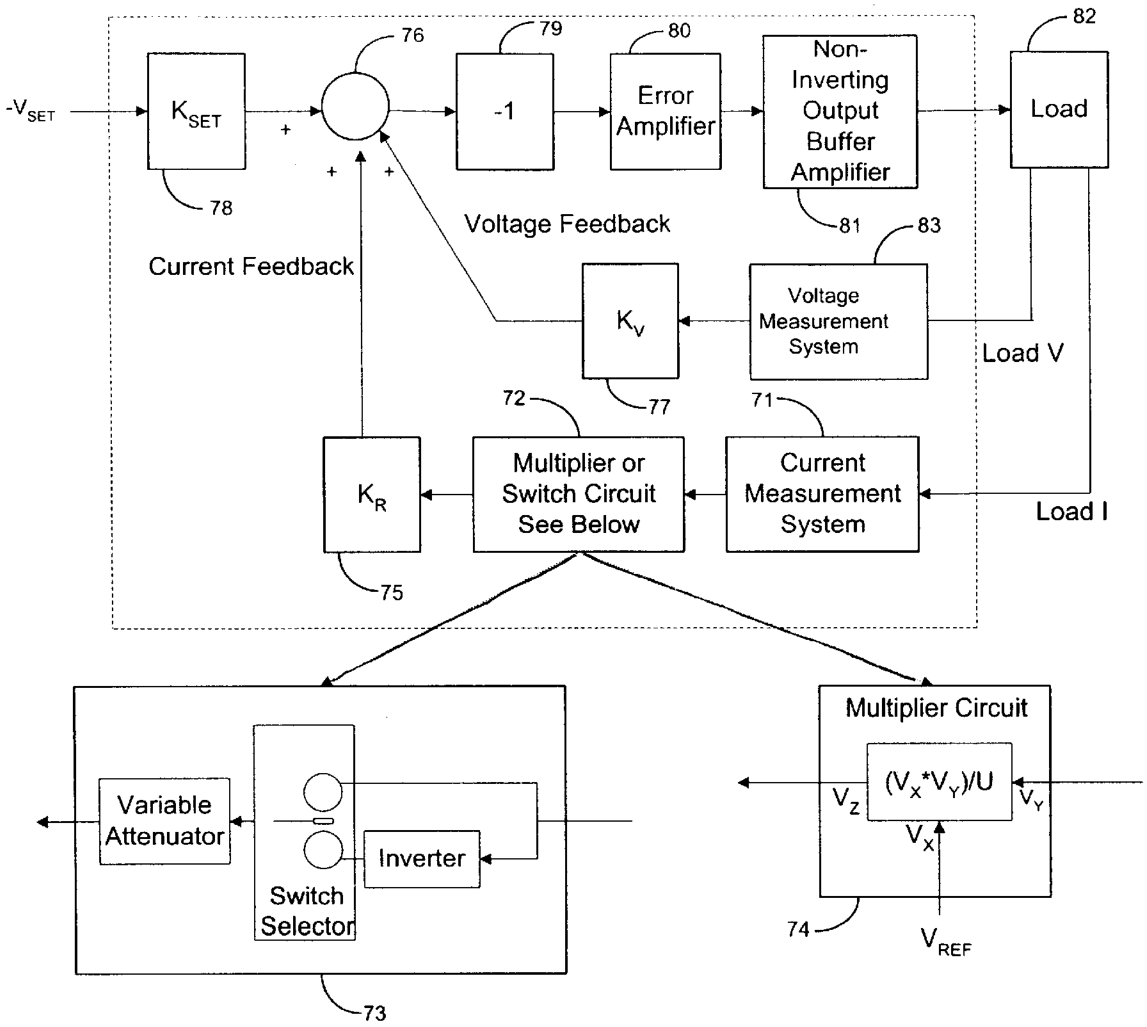
FIGURE 4: Block diagram of power supply system.

POWER SUPPLY CAPABLE OF BEING CONFIGURED TO GENERATE POSITIVE AND NEGATIVE OUTPUT RESISTANCES

TECHNICAL FIELD OF THE INVENTION

Most traditional constant voltage power supplies are designed to minimize output impedance in an attempt to simulate an ideal voltage source. The present invention relates to a power supply having an adjustable equivalent output resistance, which can be either positive or negative. Positive equivalent output resistance can be useful in the simulation of batteries where internal resistance is a critical parameter. Alternatively, negative equivalent output resistance can be utilized to greatly improve voltage regulation at the load in the situations where the voltage sense leads are located a distance from the load itself.

The present invention provides a power supply that is capable of producing a negative or positive equivalent output resistance. In accordance with the preferred embodiment of the present invention, the equivalent output resistance can be adjusted in such a way that it transitions smoothly between positive and negative values.

BACKGROUND OF THE INVENTION

Power supplies can be used to simulate a battery. This is useful to battery powered device manufacturers who require that all interactions between the device and its battery be properly tested before the unit is shipped. The battery, which is electrochemical in nature, tends to degrade over time as it is discharged and recharged. Other factors, such as thermal cycling, may also impair the performance of the battery. Using a power supply in place of the battery allows the tester to capture critical performance data about the operation of the device under test. To achieve results that closely mimic that of an actual battery, the power supply must closely match the battery's output resistance and voltage characteristics. As the battery of the device ages, degradation in its performance is caused by an increase in the internal resistance of the battery. Consider a mobile (cellular) telephone. When the phone attempts to transmit and link up, it draws a substantial amount of current, which causes the battery voltage level to drop. If the voltage drops below a critical level, the telephone call will be terminated. With age, the increase in the battery's internal resistance results in larger current draws, bigger voltage drops, and an increased number of terminated calls. Therefore, manufacturers are interested in simulating the battery resistance to better characterize these products. Hence, having the flexibility to adjust the equivalent positive output resistance of the power supply can be of particular importance.

Alternately, some manufacturers are not interested in simulating the battery resistance characteristics and are instead interested in maintaining a constant voltage at a specific load point under varying load current conditions. Utilizing remote sense leads, the voltage of the power supply can be precisely controlled at the point where the sense leads are attached. However, it is not always possible to connect the sense leads directly to the load, possibly because of mechanical interference or some other reason. As shown in FIG. 1, an additional resistance, $R_{L2}$, is found in the conducting path between the sense leads and the load, resulting in an undesired voltage drop. A power supply capable of generating a negative output resistance could solve this problem by compensating for the voltage drop caused by the resistance found after the sense leads. As a result, the voltage level supplied to the load could be accurately controlled. However, to date, such a power supply has not been produced.

Accordingly, a need exists for a power supply that is capable of generating a negative equivalent output resistance. A need also exists for a power supply that is capable of generating either negative or positive equivalent output resistances. Furthermore, a need exists for a power supply that is capable of smoothly transitioning between negative and positive equivalent output resistances. The present invention achieves these goals, as will be apparent from the following discussion.

SUMMARY OF THE INVENTION

The present invention relates to a power supply capable of being configured to produce a bipolar output resistance, i.e., either negative or positive output resistances. The electrical circuitry of the power supply is capable of being configured to produce a negative output resistance. In accordance with the preferred embodiment of the present invention, the electrical circuitry of the power supply is configured to produce either a negative or positive output resistance.

In addition, in accordance with the preferred embodiment, the electrical circuitry of the power supply is configured to enable continuous transitions to be made from negative resistance values through zero to positive resistance values, and vice versa. Preferably, the power supply comprises a multiplier chip that enables the continuous transitions to be achieved. Components other than the multiplier chip can be utilized to achieve a negative output resistance and to enable the power supply to switch between negative and positive output resistances, as discussed below in greater detail.

In accordance with this embodiment, the multiplier chip receives a reference voltage $V_{REF}$ that can be varied in magnitude and polarity in order to change the output resistance of the power supply. The reference voltage for the multiplier chip can be provided by either a potentiometer or a digital-to-analog converter capable of producing a bipolar analog voltage. Selecting an appropriate negative output resistance allows the power supply to effectively cancel the voltage drop caused by load wire resistance ($R_{L2}$ in FIGS. 1 and 2) between the sense points and the load. This allows the voltage level provided to the load to be accurately maintained at the desired set value. These and other features of the present invention will become apparent from the following descriptions, drawings, and claims.

BRIEF DESCRIPTION OF THE DRAWINGS

FIG. 1 demonstrates the use of the present invention in a circuit in accordance with an exemplary embodiment. This diagram illustrates the load wire resistance $R_{L2}$ found after the point at which the sense leads connect to the load leads.

FIG. 2 is a dc and low frequency equivalent circuit model seen at the sense leads (connection 15) in FIG. 1. This figure relates the circuit parameters and $V_{REF}$ to the equivalent output impedance $R_{EQ}$ seen at the point where the sense leads connect.

FIG. 3 is a schematic diagram of the power supply of the present invention in accordance with the preferred embodiment, wherein the power supply is capable of producing a bipolar output resistance with smooth transitions through zero.

FIG. 4 is a block diagram representation of the circuit shown in FIG. 3.

DETAILED SUMMARY OF THE INVENTION

FIG. 1 illustrates a block diagram of power supply 10 that can be configured to generate a negative and positive output resistance. However, generating a positive output resistance alone is known and is not the primary subject of the present invention. Therefore, this patent application will focus on the ability of power supply 10 to generate negative output resistance in order to accurately control the voltage level at a desired load point. Another feature of the present invention, in accordance with the preferred embodiment, is the ability of power supply 10 to transition smoothly from negative to positive resistance via the use of a multiplier chip, as described below in detail.

As shown in FIG. 1, power supply 10 comprises four output terminals, namely, "high sense" output 11, "high out" output 12, "low out" output 13, and "low sense" output 14. $R_{L1}$ represents the resistance of the load lead cabling between the power supply output 12 and sense point 15. The resistance in the low out load lead is lumped into $R_{L1}$ for clarity. $R_{L2}$ 24 represents the resistance of the load leads after the point at which the sense wires are connected.

The Current $I_{LOAD}$ and the resistance $R_{L1}$ cause a voltage drop at sense point 15. Present art power supplies compensate for this drop by utilizing the sense leads and remotely sensing, the voltage at this point. This allows the power supply to appropriately modify its output voltage at 12 and 13 to compensate for the drop across $R_{L1}$. Resistance $R_{L2}$ represents the remaining resistance in the load lead wires after the point where the sense leads are connected to the load wires. As previously discussed, this length of wire, the voltage drop of which is not seen by the sense leads, may be present for any number of reasons, such as mechanical interference in the hookup, for example. Present art power supplies have no mechanism to compensate for the voltage drop associated with $R_{L2}$.

In accordance with the present invention, it has been determined that by generating a negative output resistance that is equal and opposite to resistance $R_{L2}$, the voltage $V_{LOAD}$ can be precisely controlled. This can be seen in FIG. 2, which is a model of power supply 10 illustrated in FIG. 1. In this figure $V_{SET}(R_1R_V)/(R_{SET}R_F)$ represents the source voltage of the power supply and $R_{EQ}$ represents the output resistance. The equations describing the output resistance and source voltage will be discussed below with reference to Equation 6.

A practical implementation of power supply 10 is shown in FIG. 3 and is represented by the numeral 30. The power supply 30 comprises a differential amplifier 31, which receives the voltage from the terminals labeled high sense and low sense. It should be noted that the terms high and low do not necessarily imply positive or negative since the following discussion and equations apply equally well to a dc source, a bipolar or multi-quadrant dc source, or an ac source.

The voltage on the sense leads is fed back through a differential amplifier 31, which has a gain equal to $R_F$ divided by $R_1$, where these values correspond to the values of resistors 34 and 35, respectively. Those skilled in the art will realize that any circuit that amplifies the sense voltage with respect to common, such as an instrumentation amplifiers could be used in place of the differential amplifier. However, for the purposes of this patent the differential amplifier approach is employed. The differential amplifier 31 obtains the difference in voltage between the high sense and low sense leads, which is referred to as $V_{SENSE}$ and multiplies it by the ratio $R_F/R_1$, resulting in the voltage $V_{MONITOR}$. $V_{MONITOR}$ serves as one of three inputs to error amplifier 38 which is depicted as an op amp but could be any combination of error amplifier and buffer stage capable of delivering sufficient voltage and current to the load. The additional inputs to error amplifier 38 are: $-V_{SET}$ and $V_Z$, both of which will be discussed below in detail.

Because the power supply is wrapped in a negative feedback loop, the inverting input 61 of the error amplifier functions as a summing junction and remains at common potential. Three currents are summed at the non-inverting terminal 62: $V_Z/R_R$, $V_{MONITOR}/R_V$, and $-V_{SET}/R_{SET}$. As defined by Kirchhoff's current law, the sum of these currents must be zero, resulting in the following equation:

$$\frac{-V_{SET}}{R_{SET}} + \frac{V_Z}{R_R} + \frac{V_{MONITOR}}{R_V} = 0 \qquad 1$$

It was previously stated that $$V_{MONITOR} = \frac{R_F}{R_I} V_{SENSE} \qquad 2$$

Substituting and rearranging the terms, it can be shown that $V_{SENSE}$ is linearly related to $V_{SET}$ along with another term related to $V_Z$, (the multiplier output). Hence:

$$V_{SENSE} = V_{SET}\left[\frac{R_I R_V}{R_{SET} R_F}\right] - V_Z\left[\frac{R_I R_V}{R_F R_R}\right] \qquad 3$$

The second term will be shown later to be a function of output current $I_{LOAD}$.

It should be noted that buffer amplifier 45 in FIG. 3 ensures that all of the load current, $I_{LOAD}$) flows through $R_{SHUNT}$ 47 and virtually none in the low sense lead.

Capacitor 53 and resistor 52 supply frequency compensation to ensure loop stability. As is generally known in the art, the frequency characteristics can be varied to control the stability of the feedback loop.

In accordance with the preferred embodiment of the present invention, a multiplier chip 60 is used in circuit 30. However, as will be discussed below, the multiplier chip 60 is not required to obtain positive and negative output resistance. Other types of circuits could perform the multiplier chip's function, but they may he unable to provide the smooth transition of the output resistance though zero.

The configuration of the circuit 30 is such that the voltage at node 47, also known as $V_Y$, is directly proportional to the load current $I_{LOAD}$ and is equal to $(I_{LOAD})(R_{SHUNT})$. In order to generate the voltage $V_Z$, the multiplier chip 60 multiplies a reference voltage $V_{REF}$, by $V_Y$. The result is divided by the multiplier chip's internal scaling denominator voltage 'U', which is typically 10 volts, to obtain a resulting $V_Z$. This relationship can be written as $$V_Z = \frac{V_{REF} V_Y}{U} \qquad 4$$

Where $V_Z$ is the multiplier chip output voltage. $V_{REF}$ is the reference input, $V_Y$ is the voltage across $R_{SHUNT}$, and U is the multiplier chip divider.

Because of this relationship, the voltage $V_Z$ is proportional to the output current of circuit 30. In this way, error amplifier 38 can modify the output voltage of circuit 30 in response to the output current, which is equal to $I_{LOAD}$.

Adjusting the polarity of reference voltage $V_{REF}$ controls the polarity of $V_Z$ and thus the polarity of the current being summed at the inverting terminal 61 of amplifier 38. As a result, the current $V_2/R_R$ and feedback from the multiplier chip can be negative or positive. This point is illustrated in FIG. 4, as discussed below in further detail. When negative feedback is employed, an equivalent positive output resistance $R_{EQ}$ results. Utilizing positive feedback results in a negative output resistance. The following derivation proves this point. We know that $$V_Y=(I_{LOAD})(R_{SHUNT}) \quad 5$$

Substituting equation 5 into equation 4 and this result into equation 3 we have:

$$V_{SENSE} = V_{SET}\left[\frac{R_I R_V}{R_{SET} R_F}\right] - I_{LOAD}(V_{REF})\left[\frac{R_{SHUNT} R_I R_V}{R_F R_R U}\right] \quad 6$$

Which can be written as $$V_{SENSE}=V_{SET}[K]-I_{LOAD}[R_{EQ}] \quad 7$$

Where K is a constant controlled by the resistor values selected and $R_{EQ}$ represents the equivalent output resistance. This verifies the voltage and equivalent resistance terms shown in FIG. 2.

Although the multiplier chip can provide some positive feedback it should be noted that the net feedback of the entire loop must be negative to ensure stability. A potentiometer circuit or a digital-to-analog converter (DAC) can be used to vary the magnitude and polarity of the $V_{REF}$ input into the multiplier chip circuit 60. This allows the power supply circuit 30 to make a smooth transition from negative resistance through zero, to positive resistance, and vice versa.

Alternatively in place of the multiplier chip, bipolar output resistance could be accomplished by selecting between the voltage across $R_{SHUNT}$ or its inverse through an inverter. This would provide zero to negative resistance programmability when the inverter is utilized. If the inverter is not selected, the circuit would provide zero to positive resistance programmability. Therefore, the smooth transitions made possible by using multiplier chip 60 would not be possible utilizing this configuration. Those skilled in the art will understand the manner in which such alternative solutions could be implemented.

FIG. 4 is a block diagram of the circuit shown in FIG. 3. This diagram illustrates the mix of voltage and current feedback required to achieve the desired equivalent output resistance. The current measurement system 71 provides a voltage that is proportional to the load current. This allows the current feedback to be adjusted positive or negative by the multiplier circuit 72, 74 or other switching circuit 73. The voltage across the load is measured by a high impedance voltage measurement system 83, which may consist of a differential or instrumentation amplifier. The multiplier or switch circuit output $V_Z$, $V_{MONITOR}$, and $-V_{SET}$ are scaled by Kr 75, Kv 77, and Kset 78, respectively and summed at junction 76. The result is used to drive an inverting error amplifier 79, 80. The noninverting output buffer 81 provides extra drive capacity as required by the load 82.

Note that the voltage loop utilizes "traditional" negative feedback, while the current feedback may be either positive or negative depending on the polarity of equivalent output resistance desired. In all cases the total of all feedback is negative as required to maintain stability.

Although the power supply circuit of the present invention has been described with reference to testing a battery operated device or cellular telephone, those skilled in the art will understand that having the capability of generating a negative output resistance is not limited to any particular application or implementation. As stated above, the power supply circuit is not limited with respect to the components that are utilized to implement the circuit. Variations and modifications can be made to the circuit that are within the scope of the present invention.

What is claimed is:

1. A power supply comprising:

a voltage source having an output resistance;

first and second output sense terminals;

output resistance control circuitry which controls the output resistance according to a product of a current supplied by the voltage source and a predetermined value; and output voltage control circuitry which controls a voltage of the voltage source according to a feedback voltage at the first and second output sense terminals.

2. The power supply of claim 1, wherein the output resistance control circuitry is controllable to provide the output resistance in a range including positive and negative values.

3. The power supply of claim 1, wherein the output voltage control circuitry is variable to select the voltage to be supplied to the load.

4. The power supply of claim 1, wherein the output resistance control circuitry comprises a multiplier integrated circuit having first and second input terminals and an output terminal, the first input terminal of the multiplier integrated circuit receiving a reference voltage that is variable to vary the output resistance of the voltage source, the second input terminal receiving a voltage proportional to the current supplied by the voltage source.

5. The power supply of claim 4, wherein:

the output resistance control circuitry is controllable to provide the output resistance in a range including positive and negative values; and the reference voltage provided to the first input terminal of the multiplier integrated circuit is variable to produce smooth transitions in the output resistance from the negative output resistance values to the positive output resistance values and from the positive output resistance values to the negative output resistance values.

6. The power supply of claim 5, wherein the reference voltage supplied to the first input terminal of the multiplier integrated circuit is electrically coupled to a potentiometer circuit to enable the reference voltage to be programmably varied.

7. The power supply of claim 5, wherein the first input terminal of the multiplier integrated circuit is electrically coupled to a digital-to-analog converter to enable the reference voltage to be programmably varied.

8. The power supply of claim 1, further comprising:

a buffer stage driven by an error amplifier which has a negative input terminal, a positive input terminal and an output terminal, wherein the negative input terminal of the error amplifier acts as a summing, junction and is electrically coupled to a compensation network, a current feedback scaling resistor, a voltage feedback scaling resistors and a voltage set point scaling resistor, the positive input terminal of the error amplifier being electrically coupled to common, the output of the error amplifier being electrically coupled to the compensation network and buffer stage; and a differential amplifier having a negative input terminal, a positive input terminal and an output terminal, the positive input terminal of the differential amplifier being electrically coupled to the first output sense terminal of the power supply, the negative input terminal of the differential amplifier being electrically coupled to the second output terminal of the power supply, the output terminal of the differential amplifier being electrically coupled to the negative input terminal of the error amplifier, wherein the output resistance control circuitry is electrically coupled to the negative input terminal of the error amplifier and to the second output sense terminal of the power supply.

9. A power supply comprising:

a voltage source having an output resistance;

first and second output sense terminals;

means for controlling the output resistance to provide a negative output resistance; and means for controlling the voltage source in response to a feedback voltage at the first and second output sense terminals to provide a selected output voltage level to a load electrically coupled to the output sense terminals.

10. The power supply of claim 9, wherein the means for controlling the output resistance is controllable to produce the negative output resistance or a positive output resistance.

11. The power supply of claim 9, wherein the means for controlling the voltage source is variable to change the selected output voltage level being supplied to the load.

12. The power supply of claim 9, wherein the means for controlling the output resistance comprises a multiplier integrated circuit having first and second input terminals and an output terminal, the first input terminal of the multiplier integrated circuit receiving a reference voltage that can be varied to thereby vary the output resistance of the voltage source, the second input terminal receiving a voltage proportional to a current supplied by the voltage source.

13. The power supply of claim 12, wherein:

the means for controlling the output resistance is controllable to produce the negative output resistance or a positive output resistance; and the reference voltage being provided to the first input terminal of the multiplier integrated circuit is variable to cause the output resistance of the voltage source to continuously transition from the negative output resistance to the positive output resistance, and vice versa.

14. The power supply of claim 13, wherein the first input terminal of the multiplier integrated circuit is electrically coupled to a potentiometer circuit to enable the reference voltage to be programmably varied.

15. The power supply of claim 13, wherein the first input terminal of the multiplier integrated circuit is electrically coupled to a digital-to-analog converter to enable the reference voltage to be programmably varied.

16. A method of supplying power to a load, the method comprising:

providing power to the load from a voltage source having a settable output voltage and a controllable output resistance;

setting a voltage to be supplied to the load; and controlling the output resistance in response to sensing a current through the load to maintain the load voltage.

17. The method of claim 16, wherein the setting of the voltage to be supplied to the load comprises setting a voltage level, $-V_{SET}$, such that an open circuit voltage at the load is linearly proportional to $V_{SET}$.

18. The method of claim 16, wherein:

during the setting of the voltage to be supplied to the load, the voltage source uses feedback received from the load to compensate for a load lead voltage drop at the load.

19. The method of claim 16, wherein:

the controlling of the output resistance comprises:

multiplying the sensed load current by a predetermined value; and controlling the output resistance using the multiplied sensed load current as feedback.

20. The method of claim 19, wherein the the predetermined value is programmably variable.

21. A power supply for supplying a voltage and a current to a load, the power supply comprising:

a voltage source having a source resistance and which supplies the load voltage and the load current;

a control circuit which:

sets the load voltage at a predetermined load current in response to a first reference value, and controls the source resistance in a range including positive and negative values according to a control value, the control value determined by adjusting a measure of the load current with a second reference value.

22. The power supply of claim 21, wherein the control circuit comprises:

an amplifier which:

sums the first reference value and a feedback value analogous to the load voltage to set the load voltage at the predetermined load current, and adds the control value to the sum of the first reference value and the feedback value to control the source resistance;

a shunt which converts the load current to the measure of the load current; and a multiplier which multiplies the measure of the load current by the second reference value to provide the control value.

23. The power supply of claim 21, wherein the control circuit further comprises a digital to analog converter and the digital to analog converter outputs the second reference value based on a digital input to the digital to analog converter.

24. The power supply of claim 21, wherein the power supply further comprises a potentiometer circuit which outputs the second reference value.

25. A power supply for supplying a load voltage and a load current to a load, the power supply comprising:

a voltage source;

a control circuit which:

sets the load voltage at a predetermined load current in response to a first reference value, and controls an effective source resistance of the load voltage in a range including positive and negative values according to a control value, the control value determined by feeding back one of a measure of the load current and an inverted measure of the load current, the control circuit connected between the voltage source and the load.

26. The power supply of claim 25, wherein the control circuit comprises:

an amplifier which:

sums the first reference value and a feedback value analogous to the load voltage to set the load voltage at the predetermined load current, and adds the control value to the sum of the first reference value and the feedback value to control the effective source resistance;

a shunt which converts the load current to the measure of the load current;

an inverter which inverts the measure of the load current to provide the inverted measure of the load current;

a switch which selects one of the measure of the load current and the inverted measure of the load current; and an attenuator which attenuates the selected measure of the load current to provide the control value.

27. The power supply of claim 26, wherein the attenuator is a variable attenuator.

28. An apparatus for testing a battery powered device, comprising:

a voltage source having a controllable source resistance;

a control circuit which:

sets an input voltage of the device at a predetermined load current of the device in response to a first reference value, and controls the source resistance in a range including positive and negative values according to a control value, the control value determined by multiplying a measure of the load current by a second reference value.

29. The apparatus of claim 28, wherein the control circuit comprises:

an amplifier which:

sums the first reference value and a feedback value analogous to the device voltage to set the device voltage at the predetermined load current, and adds the control value to the sum of the first reference value and the feedback value to control the source resistance;

a shunt which converts the device current to the measure of the device current; and a multiplier which multiplies the measure of the device current and the second reference value to provide the control value.

30. The apparatus of claim 28, wherein the control circuit further comprises a digital to analog converter and the digital to analog converter outputs the second reference value based on a digital input to the digital to analog converter.

31. The power supply of claim 28, wherein the apparatus further comprises a potentiometer circuit which outputs the second reference value.

32. A method of testing a battery powered device, comprising:

providing current to the device from a voltage source having a controllable source resistance;

setting an output voltage of the voltage source at a first value of device current;

measuring the device current;

regulating the voltage source by monitoring a voltage intermediate the voltage source and the device; and controlling the source resistance according to a factor determined by multiplying the measure of the device current by a predetermined value.

33. The method of claim 32, further comprising controlling the source resistance by multiplying the multiple of measure of the device current and the predetermined value by minus one.

34. An apparatus for powering a load, comprising:

means for supplying a voltage and a current to the load;

means for inputting first and second reference values;

means for regulating the voltage in response to the first reference value;

means for providing a measure of the current;

means for multiplying the measure of the current by the second reference value to provide a control value; and means for controlling a source resistance of the supplied voltage in a range including positive and negative values in response to the control value.

* * * * *